United States Patent
Abdulla et al.

(10) Patent No.: US 10,052,512 B1
(45) Date of Patent: Aug. 21, 2018

(54) ADAPTIVE TRAINER FOR MUSCLE AND JOINT CONDITIONING

(71) Applicant: Imam Abdulrahman Bin Faisal University, Dammam (SA)

(72) Inventors: Fuad Abdulrahman Abdulla, Dammam (SA); Ahmed Abdelkarim Mansi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/590,600

(22) Filed: May 9, 2017

(51) Int. Cl.
| | |
|---|---|
| A63B 21/06 | (2006.01) |
| A63B 21/00 | (2006.01) |
| G01L 5/16 | (2006.01) |
| A63B 23/035 | (2006.01) |
| A63B 23/02 | (2006.01) |
| A63B 23/04 | (2006.01) |
| A63B 23/12 | (2006.01) |

(52) U.S. Cl.
CPC .. A63B 21/00069 (2013.01); A63B 21/00072 (2013.01); A63B 23/0355 (2013.01); G01L 5/163 (2013.01); A63B 23/02 (2013.01); A63B 23/04 (2013.01); A63B 23/12 (2013.01); A63B 2220/52 (2013.01); A63B 2220/54 (2013.01); A63B 2220/58 (2013.01); A63B 2220/833 (2013.01)

(58) Field of Classification Search
CPC . A63B 21/0006; A63B 23/03; A63B 21/0007; A63B 23/01; A63B 2220/05; A63B 23/02; A63B 2220/08; A63B 23/04; G01L 5/16

See application file for complete search history.

(56) References Cited

U.S. PATENT DOCUMENTS

| | | | | | |
|---|---|---|---|---|---|
| 3,953,025 | A | * | 4/1976 | Mazman | A63B 21/015 482/118 |
| 4,171,801 | A | * | 10/1979 | Bell | A63B 21/015 482/118 |
| 4,408,613 | A | * | 10/1983 | Relyea | A61B 5/222 482/5 |

(Continued)

OTHER PUBLICATIONS

Shufang Dong, et al., "A prototype rehabilitation device with variable resistance and joint motion control", Med. Eng. Phys., vol. 28, No. 4, May 2006, pp. 348-355.

Primary Examiner — Garrett Atkinson
(74) Attorney, Agent, or Firm — Oblon, McClelland, Maier & Neustadt, L.L.P.

(57) ABSTRACT

A system and method is provided for conditioning a group of muscles and joints of a subject including: a movement assembly including an arm having a handle, such that an angular position is created by the subject's joint when the subject grips the handle, a brake, connected to the movement assembly, configured to apply a work load to the movement assembly, and a sensor configured to sense the angular position of the movement assembly; and a computing device, in communication with the sensor and the brake, configured to sense the movement of the movement assembly relative to the brake, create an encoded signal representing the movement assembly and the movement over a period of time, and modify the brake to vary the work load during a movement of the movement assembly based on timing at the angular position and a predetermined regimen.

7 Claims, 10 Drawing Sheets

(56) References Cited

U.S. PATENT DOCUMENTS

| | | | | |
|---|---|---|---|---|
| 4,628,910 A * | 12/1986 | Krukowski | A63B 21/0058 | 482/5 |
| 4,709,918 A * | 12/1987 | Grinblat | A63B 21/012 | 482/118 |
| 4,763,897 A * | 8/1988 | Yakata | A63B 21/06 | 482/100 |
| 4,772,015 A * | 9/1988 | Carlson | A63B 23/12 | 482/902 |
| 4,778,175 A * | 10/1988 | Wucherpfennig | A63B 21/005 | 482/5 |
| 4,885,939 A * | 12/1989 | Martin | A61B 5/1107 | 482/6 |
| 5,314,390 A * | 5/1994 | Westing | A63B 21/00178 | 482/111 |
| 5,328,426 A * | 7/1994 | Vendette | A63B 23/0482 | 482/39 |
| 6,050,920 A * | 4/2000 | Ehrenfried | A63B 21/0058 | 482/129 |
| 6,267,709 B1 * | 7/2001 | Jacques | A63B 21/00181 | 482/1 |
| 6,773,376 B2 * | 8/2004 | Dvir | A61B 5/224 | 482/8 |
| 7,113,166 B1 * | 9/2006 | Rosenberg | A63B 21/0057 | 345/156 |
| D637,664 S * | 5/2011 | Battison | A63B 21/012 | D21/663 |
| 8,359,123 B2 * | 1/2013 | Tong | A61H 1/0237 | 600/546 |
| 8,992,393 B2 * | 3/2015 | Reyes | A63B 21/08 | 482/100 |
| 9,669,249 B2 * | 6/2017 | Marti | A63B 71/0622 | |
| 2003/0069110 A1 * | 4/2003 | Chang | A63B 21/015 | 482/57 |
| 2009/0017993 A1 * | 1/2009 | Khanicheh | A63B 21/0056 | 482/49 |
| 2009/0259338 A1 * | 10/2009 | Tong | A61H 1/0237 | 700/258 |
| 2011/0165997 A1 | 7/2011 | Reich et al. | | |
| 2011/0300994 A1 * | 12/2011 | Verkaaik | A61H 1/0274 | 482/51 |
| 2012/0238418 A1 * | 9/2012 | Reyes | A63B 21/08 | 482/121 |

\* cited by examiner

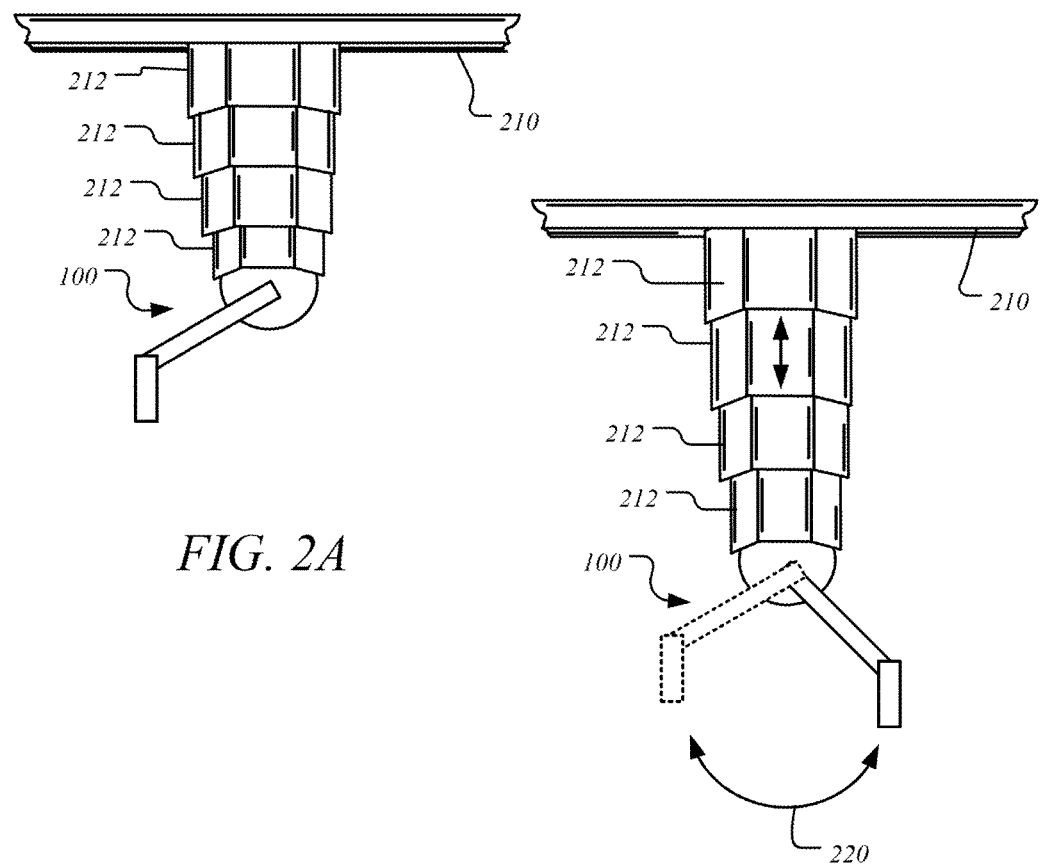
*FIG. 2A*
*FIG. 2B*
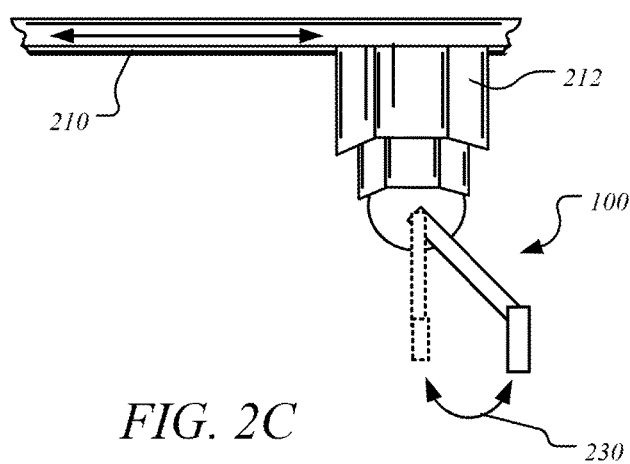
*FIG. 2C*

ADAPTIVE TRAINER FOR MUSCLE AND JOINT CONDITIONING

BACKGROUND

This disclosure is related to an adaptive trainer for individual muscles, muscle groups, and joint conditioning and rehabilitation. The adaptive trainer can be used in rehabilitation centers, professional gyms, and sports centers.

The shoulder joint, for example, is the most dynamic joint in the body, as well as the most important joint for the function of both upper and lower extremities, as well as for the function of the trunk. The shoulder joint can move in several directions including flexion, extension, abduction, adduction, horizontal flexion, extension, abduction and adduction in addition to circumduction and medial and lateral rotation. In order to achieve such movements, the shoulder joint is controlled by multiple muscle groups, where each muscle group works in a specific direction with a given range of motion.

When the shoulder joint of a subject is affected by pathology, such as frozen shoulder, the subject will gradually start losing the range of motion and strength of the shoulder joint in different directions. The subject needs to do stretching as well as strengthening exercises to maintain what is available of the range of motion and muscle strength, as well as attempt to repair the pathology.

A proper amount of resistance needs to be given at each range of motion associated with a respective muscle group. Traditionally a therapist can estimate the proper amount of resistance needed at each part of the range of motion to target the respective muscle group. However, this is labor intensive and expensive as exercises needed to be done several times per day.

SUMMARY

A system and method is provided for conditioning a group of muscles and joints of a subject including: a movement assembly including an arm having a handle, such that an angular position is created by the subject's joint when the subject grips the handle, a brake, connected to the movement assembly, configured to apply a work load to the movement assembly, and a sensor configured to sense the angular position of the movement assembly; and a computing device, in communication with the sensor and the brake, configured to sense the movement of the movement assembly relative to the brake, create an encoded signal representing the movement assembly and the movement over a period of time, and modify the brake to vary the work load during a movement of the movement assembly based on timing at the angular position and a predetermined regimen.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein:

FIG. 2A shows a rotating assembly having a frame and a set of extenders configured to move and rotate the training system including orienting the movement assembly in three dimensions according to an example;

FIG. 2B shows the rotating assembly extending along a length of the set of extenders simultaneously with a rotation of the movement assembly according to an example;

FIG. 2C shows the rotating assembly collapsed along a length of the set of extenders, and moving along the frame simultaneously with a rotation of the movement assembly according to an example;

DETAILED DESCRIPTION

Figure 1A:
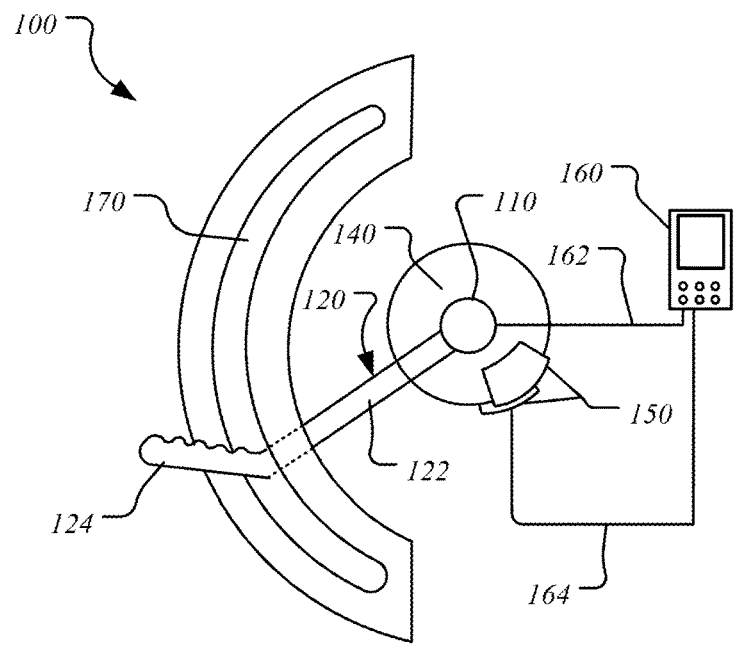
FIG. 1A shows a drawing of a training system including a potentiometer connected to a movement assembly having a handle by an arm, to a disk in contact with a brake, and a computing device according to an example.

Generally, muscle fibers of most muscles change length with joint angle so a force producing capacity of a muscle changes across the range of motion of the joint. A peak torque of the force producing capacity is typically highest in the mid-range of joint motion. However, this is not true for all muscle groups. For example, the peak torque of hip abduction is at the beginning of the range of motion and not at the mid-range of the range of motion while the peak torque of hip adduction is at the end of the range of motion. Therefore, giving maximum resistance at the mid-range will not target the peak torque in case of hip abductors and adductors. Additionally, when working with the shoulder or hip and trunk there are several muscle groups that mainly work at different parts of the range of motion. In pathological cases, the problem is usually at the end of the range of motion. However, the problem can be at any point of the range of motion; therefore the muscle (or group of muscles) may not benefit from giving the maximum resistance at the peak torque.

Using a fixed weight does not give the proper resistance at each stage of the range of motion for several reasons. First, not all the muscles are affected in the same way. Second, a muscle involved in a higher range of motion is more affected than a muscle involved in a lower range of motion. Third, after an arm movement of 90 degrees, the muscle groups have to work extra to accommodate effects of gravity and weight of the limb.

Using the disclosed system, the subject can move their limb at their own speed based on their abilities and pathological factors such as pain, strength, range of motion limitation, etc. The training system can be configured to sense a condition of each muscle group, determine an adaptive therapy regimen including a resistance and a timing to train each muscle group, and provide adaptive therapy based on the adaptive therapy regimen. In an example, each muscle group can have a different adaptive therapy regimen depending on a functional status of the muscle group. In an example, the adaptive therapy regimen can be configured to target a certain muscle or group of muscles for strengthening purposes, including a coordinated timing of a set of group of muscles for a particular motion in sports (e.g., shot put, discus, javelin, hammer throw, etc.). In this case, the adaptive therapy regimen can include an adaptive resistance configured to be modified at a certain level of movement to tailor a conditioning load against one or more targeted muscles.

Referring now to the drawings, wherein like reference numerals designate identical or corresponding parts throughout the several views.

Figure 1B:
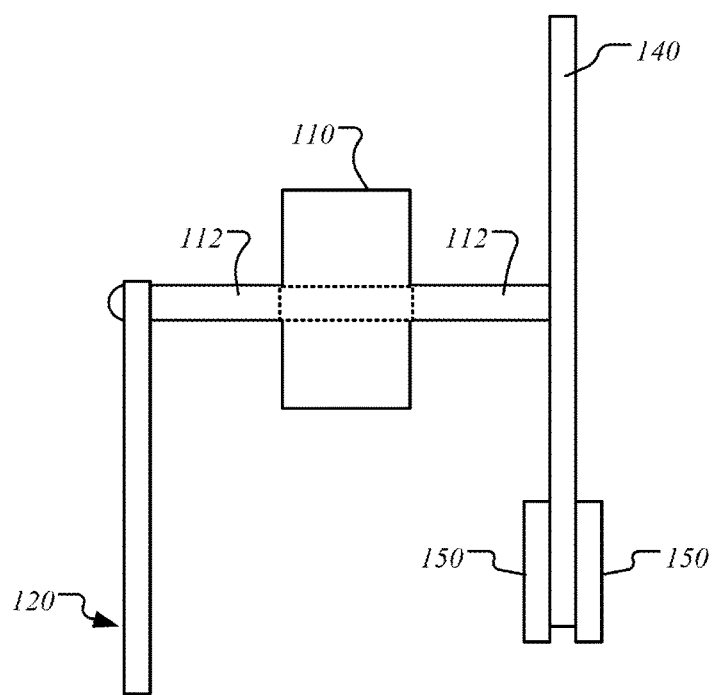
FIG. 1B shows a drawing of side view of a portion of the training system showing the potentiometer connected to the arm by an axle, the axle connected to the disk according to an example.

FIG. 1A shows a drawing of a training system 100 including a potentiometer 110 connected to a movement assembly 120 and to a disk 140 in contact with a brake 150, and a computing device 160 according to an example. FIG. 1B shows a drawing of side view of a portion of the training system 100 showing the potentiometer 110 connected to the arm 120 by an axle 112, the axle 112 connected to the disk 140 according to an example.

The movement assembly 120 is configured to translate movement from a subject (e.g., athlete, patient) to an axis of the potentiometer 110. The movement assembly 120 can include one or more interchangeable translation components such an arm 122 and a handle 124 to accommodate all limbs and body movements. Each translation components can be tailored to a targeted joint or part of the body. In an aspect, each translation component can create a different angular position with at least one of the subject's joints when the subject interfaces with the movement assembly 120. In an example, a translation component can include an optional rail 170 configured to guide the handle 130. In another example, a translation component can include a board or a plate having a vest or set of straps (not pictured) configured to translate trunk movements to the axis of the potentiometer 110.

In an example, the movement assembly 120 can include features to differentiate between pulling against the arm 122 verses pushing against the arm 122. For example, a translation component can include a shoe configured to lock into a pedal such that the leg can be engaged while pulling up on the petal as well as while pushing down on the petal. In another example, a shape of the handle 130 can be configured to modify an orientation of holding the handle 130 such that a different muscle group is engaged when held by the subject.

In an example, the brake 150 is configured to change a load to the movement assembly 120 by modifying an amount of pressure or friction to the disk 140.

The potentiometer 110 can be configured to sense an angular position of the movement assembly 120. In an example, the potentiometer 110 can be configured to encode each translation component of the movement assembly 120 used as well as orientation of the movement assembly 120.

The computing device 160 is in communication with the potentiometer 110 and the brake 150.

In an example, the computing device 160 is configured to modify the brake to vary the work load during a movement of the movement assembly 120 based on the angular position and a predetermined resistance regimen.

In some implementations, the training system 100 can operate in a learning mode and a training mode. In the learning mode, as the subject moves the movement assembly 120, the potentiometer 110 senses rotation of the axle 112 and produces an encoded signal 310 characterized by an amplitude and a duration (See FIG. 3A). The encoded signal 310 is produced by the potentiometer 110 and delivered to the computing device 160. In an example, the encoded signal 310 is delivered to the computing device 160 by an interface cable 162.

In an example, the computing device 160 is configured to analyze the encoded signal 310. In the training mode, after one or more initial maneuvers, the computing device 160 is configured to determine a resistance regimen as shown in a conditioning signal 320 of FIG. 3B. In an example, the resistance regimen can be directly proportional to the encoded signal 310 and used to control the brake 150 and to control the disc 140 adaptively.

FIG. 2A shows a rotating assembly 200 having a frame 210 and a set of extenders 212 configured to move and rotate the training system 100 including orienting the movement assembly 120 in three dimensions according to an example. The rotating assembly 200 can be rotated, moved up or down, forward or backward, and left or right to provide 360 rotation range of motion of the movement assembly 120.

FIG. 2B shows the rotating assembly 200 extending along a length of the set of extenders 212 simultaneously with a rotation 220 of the movement assembly 120 according to an example. The movement assembly 120 can be restricted to move from a first position 222a to a second position 222b, where the first position 222a is in a same plane as the second position 222b. FIG. 2C shows the rotating assembly 200 collapsed along a length of the set of extenders 212, and moving along the frame 201 simultaneously with a rotation 230 of the movement assembly 120 according to an example. The movement assembly 120 can be restricted to move from a first position 232a to a second position 232b, where the first position 232a is in a different plane as the second position 232b.

Figure 3A:
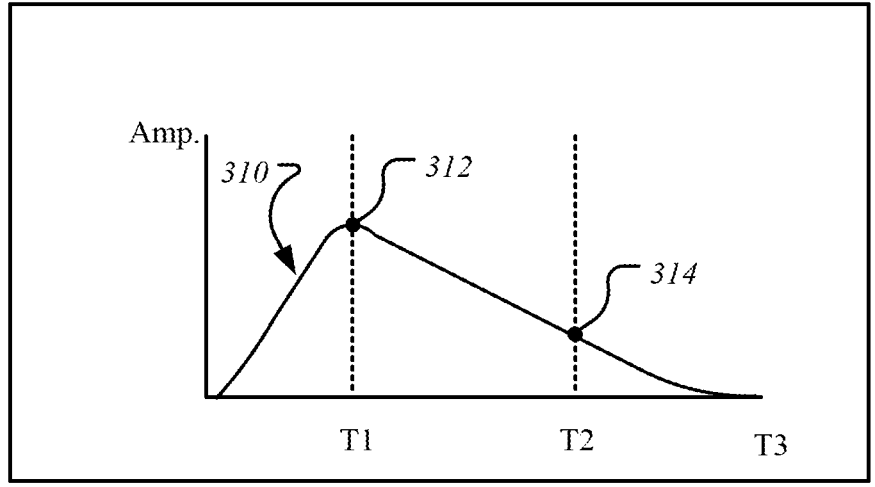
FIG. 3A is a graph showing an encoded signal produced by the potentiometer as a result of an arm motion done by the movement assembly according to an example.

FIG. 3A is an encoded signal 310 produced by the potentiometer 110 as a result of an arm motion done by the movement assembly 120 according to an example. The encoded signal 310 can vary based on muscle tension (strength), a maximum range a group of muscles can reach in normal condition, and a range in reached in pathological conditions, and other related factors. A first encoded signal in a normal condition can be compared (for example by the computing device 160) with a second encoded signal in a pathological condition to identify a pathological condition or intensity of the pathological condition.

In the learning mode, as the movement starts, the encoded signal 310 will be produced having a signature shape that is variable from one joint movement to another. In an example, the signature shape of the encoded signal 310 includes an amplitude defined by a baseline (e.g., 0 value) and one or more peaks. In an example, the encoded signal 310 will rise from zero to the peak and drop back to zero. In an example, the encoded signal 310 can demonstrate that the muscles are working healthily as indicated by a peak 312 at the beginning of the motion and smoothly fading out as indicated by low signal 314 at the end of the motion. T2 is any time during the arm movement, while T3 could represent the end of motion.

In an example, the encoded signal 310 can encode a functional status of the muscle groups as well as the joints involved in each range of motion of the movement. In an example, the functional status includes a muscular function defect that is characterized by a slowed movement. In this case, the signature shape of the encoded signal 310 will reflect a lower amplitude and a longer duration.

In another example, the encoded signal 310 may have more than one peak within a movement. Multiple peaks can indicate more than one peak torque, i.e. more than one point for a maximally generated tension that can be observed during certain activities.

In an example, the one or more peaks can be anywhere within the range of motion of the movement. In another example, there can be a peak for a portion, associated with a specific group of muscles or each partial range of motion of joint within the movement.

Figure 3B:
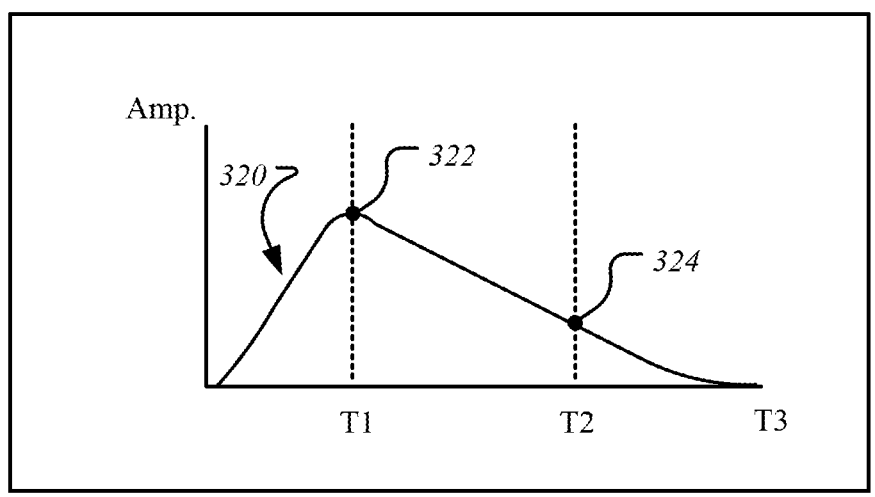
FIG. 3B is a graph showing a conditioning signal based on the encoded signal according to an example.

In an example, the encoded signal 310 can encode a functional status based on a movement threshold. The movement threshold can be set as a function of time (movement threshold timing) as shown in FIGS. 3A-3B, or an angle of motion (movement threshold angle, not shown). In an example, the movement threshold timing can be more accurate than the movement threshold angle for the following reasons. Not all muscle group peak torque is at the mid-range; therefore using the movement threshold angle to calculate the resistance can be misleading. A complex joint like the shoulder has many muscle groups contributing to the movement with an overlapping range with other muscle groups, therefore using the movement threshold angle can be misleading.

In case of pathology (pain, weakness, stiffness), the movement threshold angle may not be an accurate measure for thresholds at different parts of the available range. Movement might be slower at parts than others which make using the movement threshold angle misleading. Using the movement threshold timing will be more appropriate and will reflect the actual movement more accurately. The movement threshold timing can also reflect the weak or defective movement (muscles and joints functional status) better than the movement threshold angle.

In the training mode, the training system 100 can provide adaptive resistance based on the encoded signal 310. In an example, the encoded signal 310 can be used to reflect the required resistance using an algorithm to match each point in the encoded signal 310 with the adaptive resistance. In an example, the adaptive resistance can be adjusted using a % resistance modifier. The adaptive resistance can linear or non-linear in nature.

In an example, when the % resistance modifier is set to 50%, the brake 150 will be configured to adjust force against the disc 140 and apply half the resistance to the movement assembly 120. In an example, the % resistance modifier can be set more than 100% (e.g., 150%) to provide a resistance configured to increase a muscular load (strengthening) specific muscle or muscles group, as well as provide isometric contraction. Consequently, the resistance will be adaptive, i.e. varies up and down through the movement to accommodate variable functional status of muscles.

In addition, the training system 100 can be configured to switch between the learning mode and the training mode every "X" number of repetitions or cycles. In this case, the adaptive resistance will be modified throughout the session to adapt to changes in the subject's tolerance.

FIG. 3B is a conditioning signal 320 that is directly proportional to the encoded signal 310 and used to adaptively control pressure of the brake 150 to the disc 140.

In an example, the resistance regimen can be directly proportional to the encoded signal 310 and used to adaptively control pressure of the brake 150 to the disc 140. In this case the brake 150 will respond adaptively to increase resistance (work load) 322, on the muscles which produced higher signal, and decrease the work load 324 on the late muscles (that produced lower signal), keeping a constant work load, controlled by the % resistance modifier, for all muscles.

Figure 4:
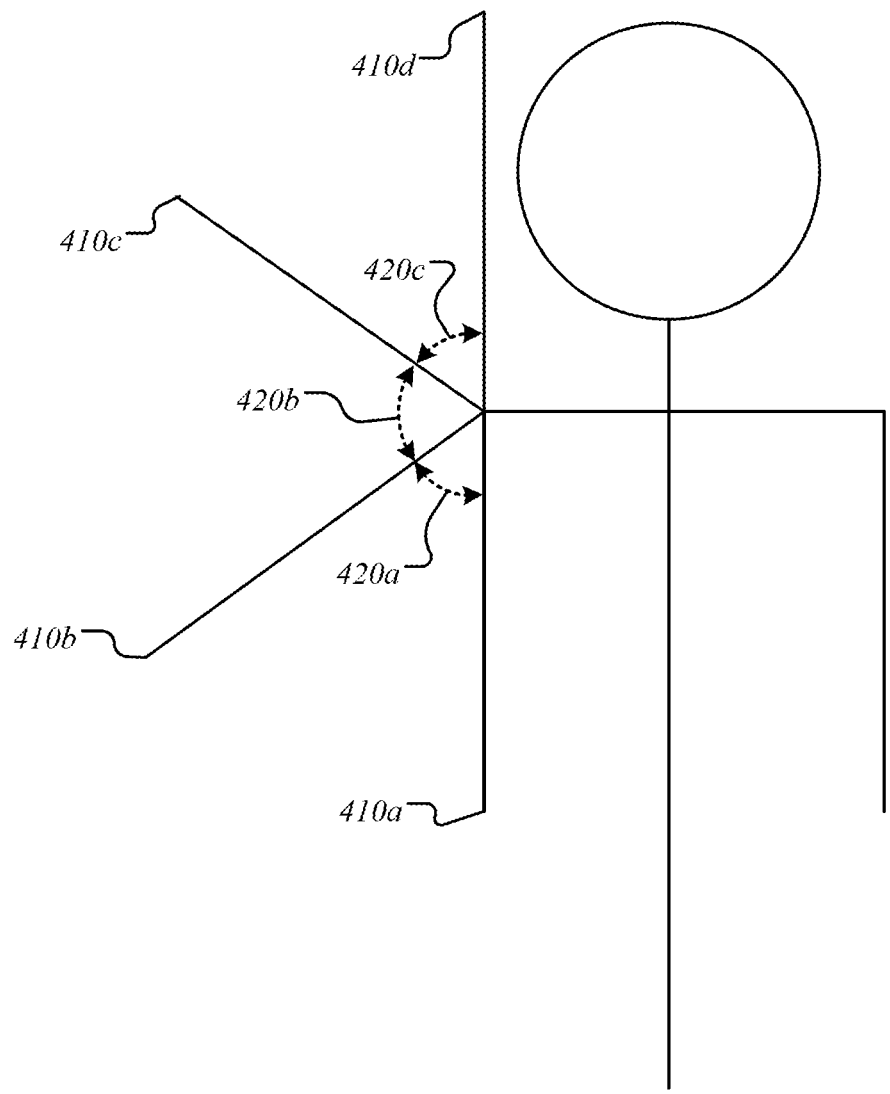
FIG. 4 shows a drawing of an arm moving between different anatomical positions, where each movement has a range of motion corresponding with a muscle group according to an example.

FIG. 4 shows a drawing of an arm moving between different anatomical positions 410a-d, where each movement has a range of motion 420a-c corresponding with a muscle group according to an example. In the case of flexion and horizontal flexion, as shown in FIG. 4 for example, moving the whole arm from an anatomical position 0 degrees (410a) to an anatomical position 180 degrees (410d) the muscle groups involved will be as follows.

A range of motion 420a, from the anatomical position 0 degrees (410a) to an anatomical position 60 degrees (410b), involves the anterior fibers of the deltoid, coracobrachialis and the clavicular fibers of pectoralis major. When the tension of the coraco-humeral ligament, teres minor, teres major or infraspinatus is too resistant, the range of motion 420a will be limited.

A range of motion 420b, from the anatomical position 60 degrees (410b) to an anatomical position 120 degrees (410c), involves the trapezius and anterior serratus. The range of motion 420b can be limited by resistance of latissimus dorsi and the costo-sternal fibers of pectoralis major.

A range of motion 420c, from the anatomical position 120 degrees (410c) to the anatomical position 180 degrees (410d), requires combined movements of the shoulder joint and the shoulder girdle, as well as movement of the spinal column. The glenohumeral joint is the main sub-joint of the shoulder and can be flexed only to approximately 120 degrees. The remaining 60 degrees of the range of motion 420c is attained as a result of the abduction and lateral or upward rotation of scapula at the scapula-thoracic joint, allowing the glenoid fossa to face more anteriorly and the humerus to flex to a fully vertical position. Therefore to get to a full flexion of anatomical positions (410a-d) the subject needs to work all these muscle groups at a proper time.

Figure 5A:
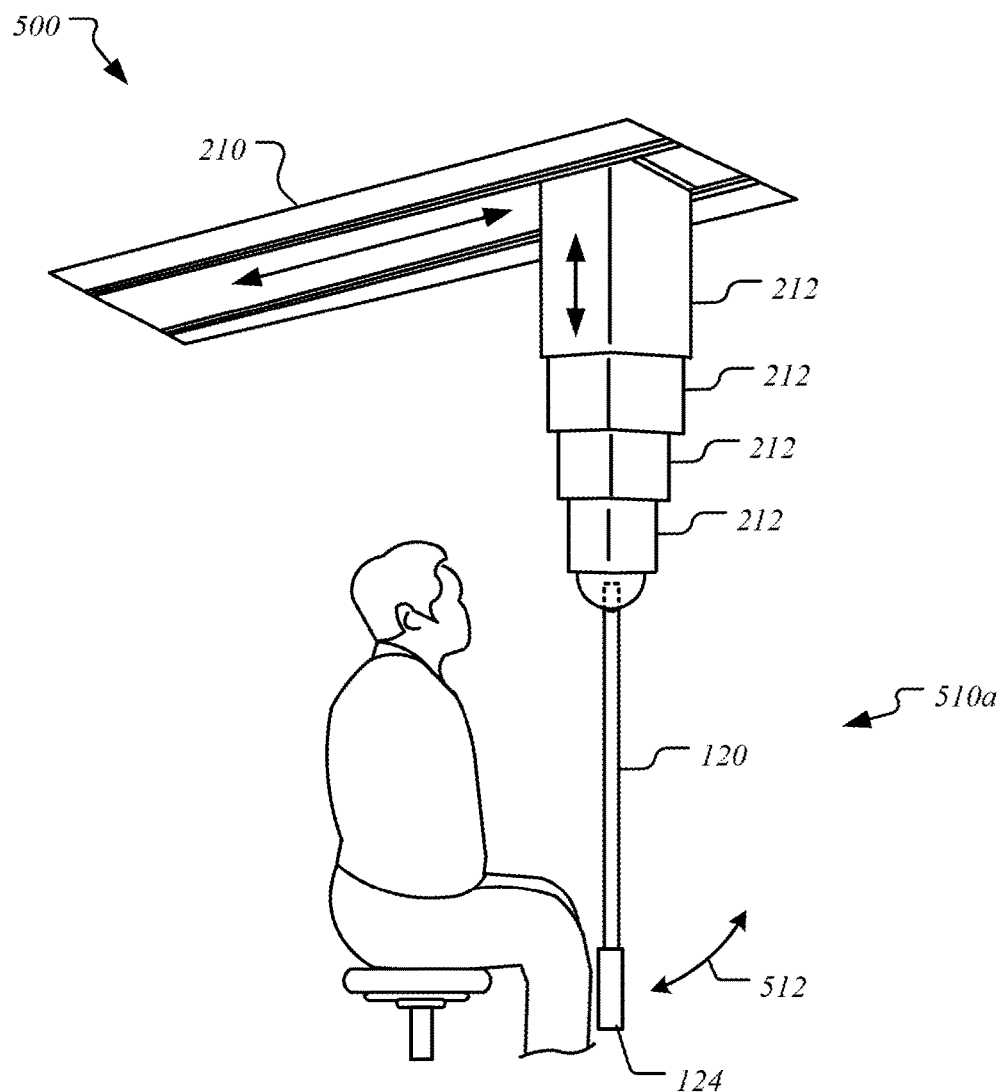
FIG. 5A shows a drawing of a movement assembly configured to condition a knee joint of a subject according to an example.
Figure 5B:
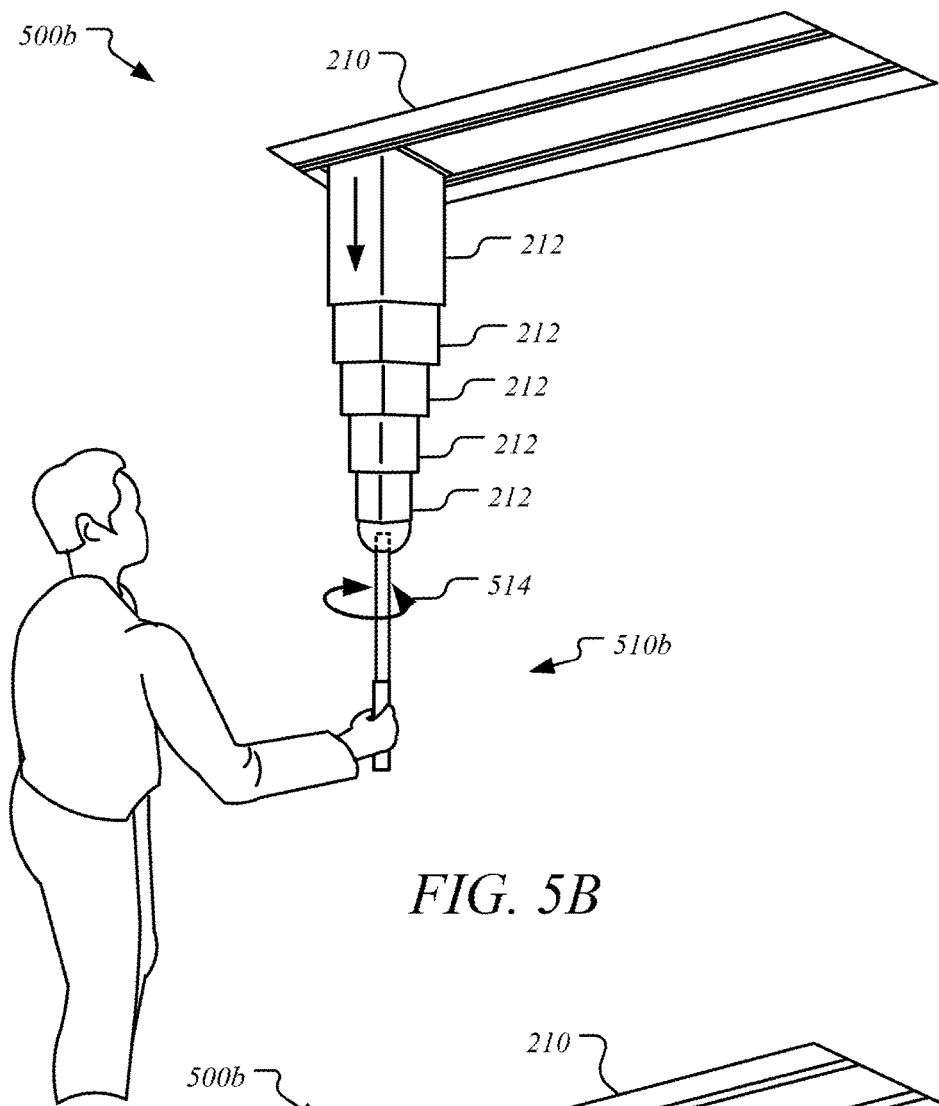
FIGS. 5B-5C shows a drawing of a movement assembly configured for trunk standing forward flexion of a subject according to an example.
Figure 5C:
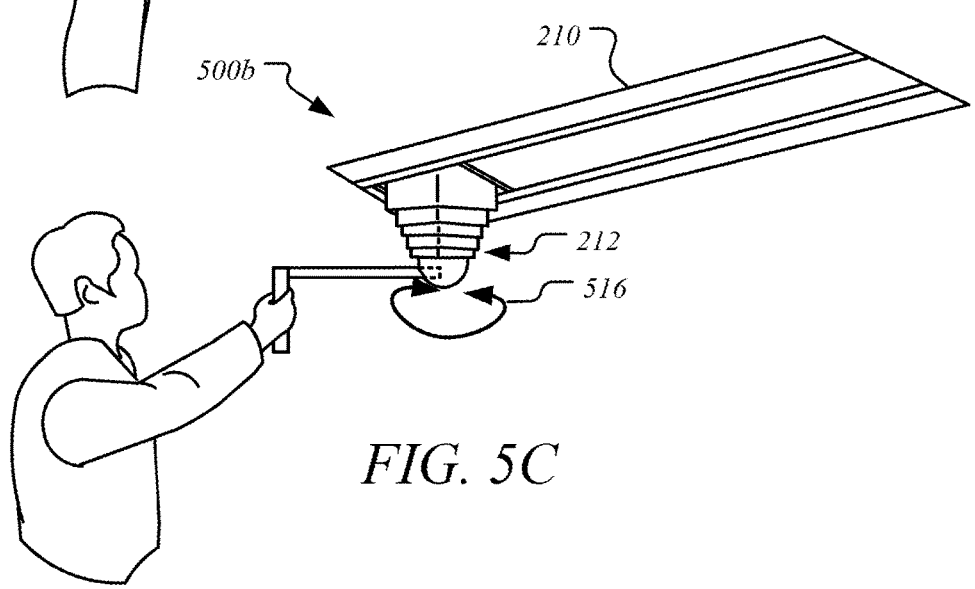
Figures 5D, 5E:
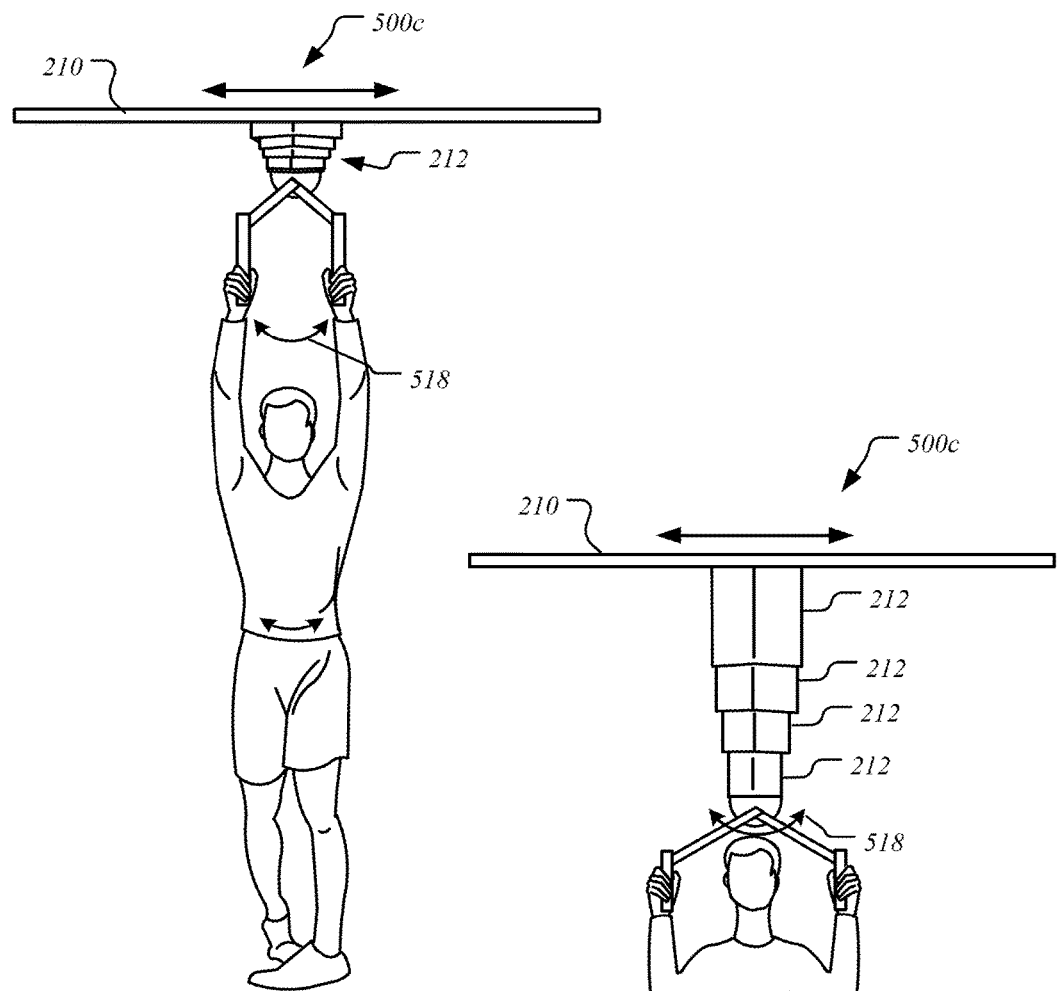
FIGS. 5D-5E shows a drawing of a movement assembly configured for trunk rotation of a subject according to an example.

Shoulder joint movement and muscles involved described are only an example; the training system 100 is not limited to shoulder conditioning and rehabilitation. For example, FIG. 5A shows a drawing of a training system 500 including a movement assembly 510a oriented to condition a subject's knee joint with a movement 512. In an example, the training system 100 can be oriented for trunk seating or standing forward flexion and trunk rotation and can be configured to provide adaptive resistance to condition the subject's trunk muscles. FIGS. 5B-5C shows a drawing of a training system 500b including a movement assembly 510b oriented for trunk standing forward flexion of a subject with a movement 514, 516 according to an example. FIGS. 5D-5E shows a drawing of a training system 500c including a movement assembly 510b oriented for trunk rotation of a subject with a movement 518 according to an example.

Figure 5F:
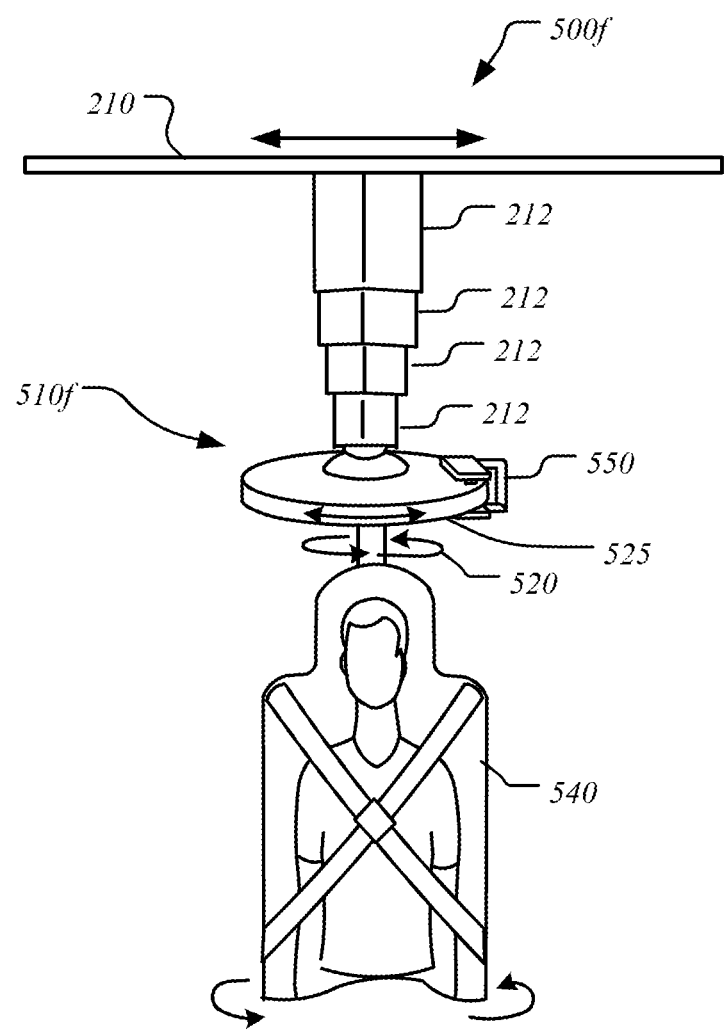
FIG. 5F shows a drawing of a movement assembly configured for trunk rotation of a subject according to an example.

FIG. 5F shows a drawing of a training system 500f including a movement assembly 510f oriented for trunk rotation of a subject with a movement 520 according to an example. In FIG. 5F, the subject is fastened to a board 540 and the board 540 is attached to the training system 500f. Furthermore, the training system 500f includes a brake 550 and a disc 525. The disc 525 is configured to allow rotation (e.g., manually or automatically via a motor) of the board 540, which in turn causes rotation of the trunk of the subject. The brake 550 is configured to slow down or stop a rotation of the disc 525, thus controlling the speed and degree of rotation of the trunk of the subject. The brake 550 can be a disc brake configured to receive encoded signal 310 (in FIG. 3A) from the computing device 160, a controller 600 or other mobile device. Based on the encoded signal 310, the brake 550 can be activated to adjust the resistance of the training system 500f. The brake 550 can have a high sensitivity to allow quick adjustment of the resistance level.

Figure 5G:
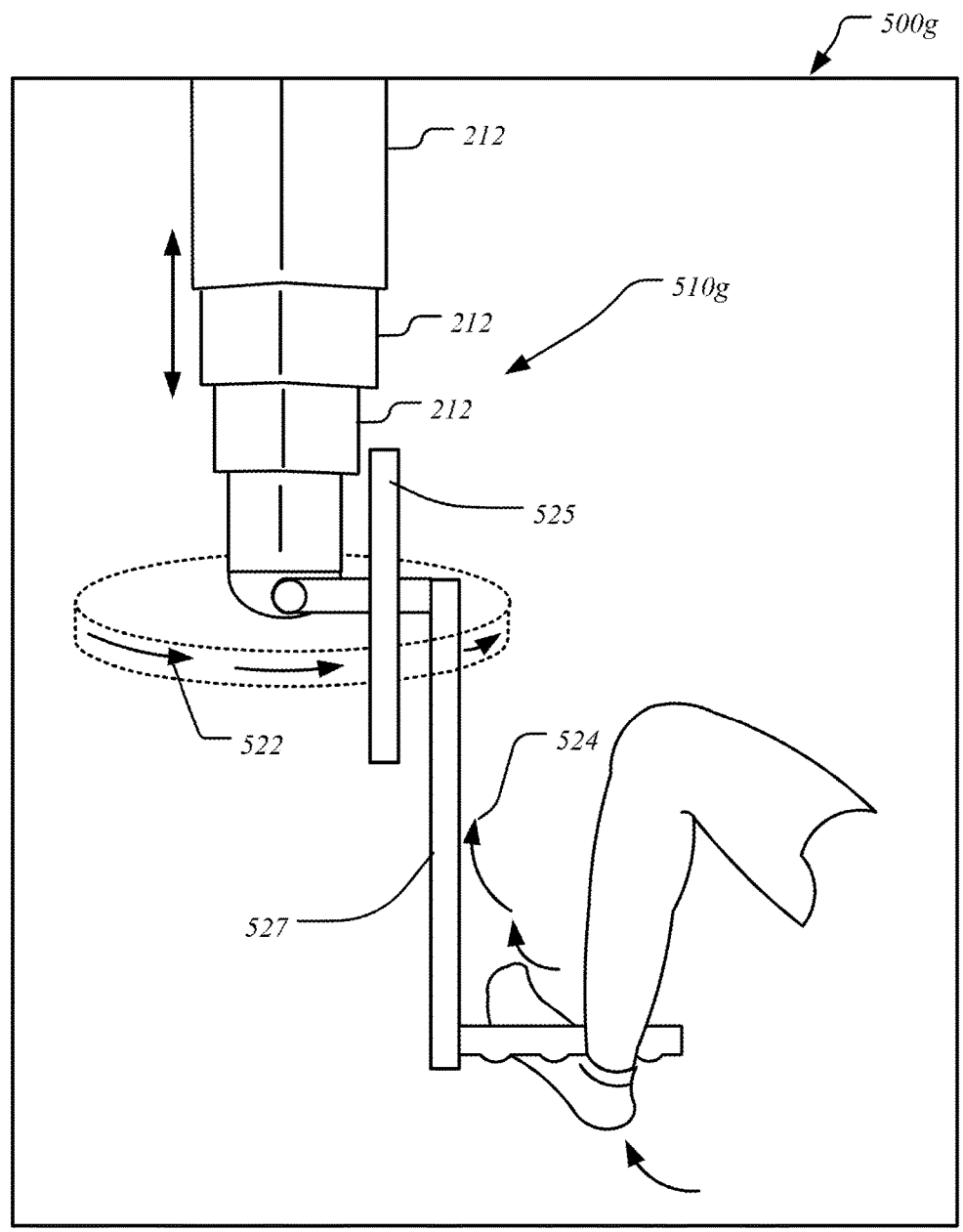
FIG. 5G shows a drawing of a movement assembly configured to condition a leg of a subject according to an example.

FIG. 5G shows a drawing of a training system 500g including a movement assembly 510g oriented for leg training of a subject with a movement 522 and 524 according to an example. The training system 500g also includes the disk 525 is mounted vertically. The disk 525 is further connected to a handle 527 configured to allow a leg and/or arm training of the subject. The training system 500g can be further modified to train muscles in the other direction (extension) as well as abduction and adduction, and can also be modified to train the knee flexors and extensors, as can be understood by a person skilled in art.

Hardware Description

Figure 6:
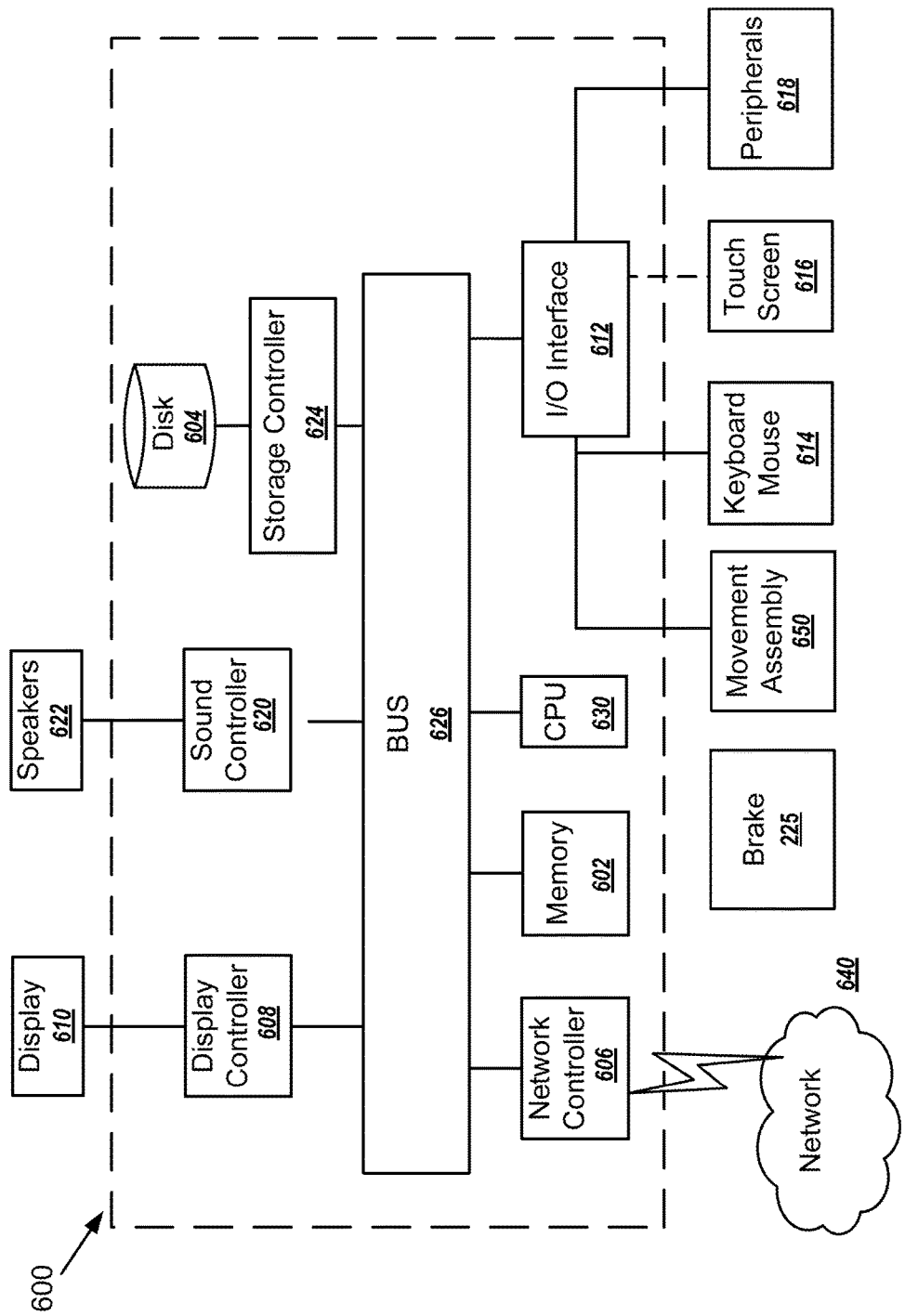
FIG. 6 is a block diagram of an example computing device.

Next, a hardware description of the computing device 160, 600, mobile computing device, or server according to exemplary embodiments is described with reference to FIG. 6. In FIG. 6, the computing device 600, mobile computing device, or server includes a CPU 630 which performs the processes described above. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 630 and an operating system such as Microsoft Windows 7, UNIX, Solaris, LINUX, Apple MAC-OS and other systems known to those skilled in the art.

CPU 630 may be a Xenon or Core processor from Intel of America or an Opteron processor from AMD of America, or may be other processor types that would be recognized by one of ordinary skill in the art. Alternatively, the CPU 630 may be implemented on an FPGA, ASIC, PLD or using discrete logic circuits, as one of ordinary skill in the art would recognize. Further, CPU 630 may be implemented as multiple processors cooperatively working in parallel to perform the instructions of the inventive processes described above.

The computing device, mobile computing device, or server in FIG. 6 also includes a network controller 606, such as an Intel Ethernet PRO network interface card from Intel Corporation of America, for interfacing with network 640. As can be appreciated, the network 628 can be a public network, such as the Internet, or a private network such as an LAN or WAN network, or any combination thereof and can also include PSTN or ISDN sub-networks. The network 628 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. In an example, the I/O interface 612 is configured to interface with a movement assembly 650. In another example, the movement assembly 650 can be configured to interface with the network 628 and the network controller 606 wirelessly. The I/O interface 612 can also connect to a variety of peripherals 618 including printers and scanners, such as an OfficeJet or DeskJet from Hewlett Packard. The I/O interface 612 can also send and receive signal encoded signal 310 to the brake 225 to control the resistance level of the training system 500.

A sound controller 620 is also provided in the computing device, mobile computing device, or server, such as Sound Blaster X-Fi Titanium from Creative, to interface with speakers/microphone 622 thereby providing sounds and/or music. In an example, the sound controller 620 can be configured to provide feedback based on the conditioning signal 320, the adaptive therapy regimen, and the adaptive resistance.

The general purpose storage controller 624 connects the storage medium disk 604 with communication bus 626, which may be an ISA, EISA, VESA, PCI, or similar, for interconnecting all of the components of the computing device, mobile computing device, or server. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for training a group of muscles and joints of a subject, the system comprising:
    a movement assembly including
        an arm having a handle and being configured to move one or more positions to create an angular position by the subject's joint when the subject grips the handle,
        a brake connected to the movement assembly and configured to apply a work load to the movement assembly, and
        a sensor configured to sense the angular position of the movement assembly; and
    processing circuitry, in communication with the sensor and the brake, and configured to
        sense the movement of the movement assembly relative to the brake,
        create an encoded signal including a timing at the angular position of the movement assembly and movement over a period of time, and
        modify the brake to vary the work load during a movement of the movement assembly based on the encoded signal and a predetermined regimen.

2. The system of claim 1, further comprising: a rail configured to restrict a range of motion of the movement assembly in at least one direction.

3. The system of claim 1, wherein the sensor is a potentiometer configured to
    sense the movement of the movement assembly relative to the brake, and
    create an encoded signal representing the movement assembly and the movement over a period of time, and
    wherein the processing circuitry is configured to identify each muscle group and determine a new regimen based on the encoded signal.

4. The system of claim 1, wherein the processing circuitry is configured to correlate the encoded signal with two or more ranges of movement of the group of muscles and joints, and determine a new regimen based on the correlation.

5. The system of claim 1, wherein the processing circuitry is configured to identify a muscle joint of a subject during a movement type including at least one of flexion, extension, abduction, adduction, horizontal flexion, extension, abduction, adduction, circumduction, and medial and lateral rotation.

6. The system of claim 1, wherein the processing circuitry is configured to correlate the encoded signal with two or more types of movement of the group of muscles and joints.

7. The system of claim 1, wherein the brake is a disk brake that can receive signal from the processing circuitry to adjust a resistance level based on the range of motion of the group of muscles and joints.

* * * * *